US008520972B2

(12) United States Patent
Sunkavalli et al.

(10) Patent No.: US 8,520,972 B2
(45) Date of Patent: Aug. 27, 2013

(54) IMAGE DECOMPOSITION

(75) Inventors: Kalyan Sunkavalli, Cambridge, MA (US); Sylvain Paris, Boston, MA (US); Wojciech Matusik, Lexington, MA (US)

(73) Assignee: Adobe Systems Incorporated, San Jose, CA (US)

( * ) Notice: Subject to any disclaimer, the term of this patent is extended or adjusted under 35 U.S.C. 154(b) by 853 days.

(21) Appl. No.: 12/323,663

(22) Filed: Nov. 26, 2008

(65) Prior Publication Data
US 2010/0067824 A1  Mar. 18, 2010

Related U.S. Application Data

(60) Provisional application No. 61/096,631, filed on Sep. 12, 2008.

(51) Int. Cl.
G06K 9/40 (2006.01)
(52) U.S. Cl.
USPC .......................... 382/274; 382/173; 382/302
(58) Field of Classification Search
USPC .................. 345/419, 426, 427, 581, 582, 589, 345/592; 348/586; 382/159, 167, 173, 282, 382/284; 726/6, 28
See application file for complete search history.

(56) References Cited

U.S. PATENT DOCUMENTS

| | | | | |
|---|---|---|---|---|
| 6,097,853 A * | 8/2000 | Gu et al. | | 382/282 |
| 6,269,195 B1 * | 7/2001 | Gonsalves et al. | | 382/284 |
| 6,571,012 B1 * | 5/2003 | Pettigrew | | 382/167 |
| 7,106,343 B1 * | 9/2006 | Hickman | | 345/589 |
| 7,162,083 B2 * | 1/2007 | Mayhew et al. | | 382/173 |
| 7,167,173 B2 * | 1/2007 | Balmelli et al. | | 345/419 |
| 7,239,314 B2 * | 7/2007 | Johnston | | 345/426 |
| 7,425,958 B2 * | 9/2008 | Berger et al. | | 345/427 |
| 7,427,991 B2 * | 9/2008 | Bruderlin et al. | | 345/581 |
| 7,636,128 B2 * | 12/2009 | Sun et al. | | 348/586 |
| 7,692,664 B2 * | 4/2010 | Weiss et al. | | 345/592 |
| 7,978,906 B2 * | 7/2011 | Jojic et al. | | 382/159 |
| 2009/0235364 A1 * | 9/2009 | Cohen et al. | | 726/28 |
| 2009/0316988 A1 * | 12/2009 | Xu et al. | | 382/173 |
| 2010/0169958 A1 * | 7/2010 | Werner et al. | | 726/6 |
| 2010/0278450 A1 * | 11/2010 | Derrenberger et al. | | 382/284 |
| 2011/0205237 A1 * | 8/2011 | Zaklika et al. | | 345/582 |

OTHER PUBLICATIONS

Singaraju, D., et al., "Interactive image matting for multiple layers," IEEE International Conference on Computer Vision and Pattern Recognition, Jun. 23-28, 2008.*
Jojic, N., et al., "Epitomic analysis of appearance and shape," Ninth IEEE International Conference on Computer Vision (ICCV'03), Oct. 13-16, 2003.*
White, R., et al., "Combining Cues: Shape from Shading and Texture," IEEE Computer Society Conference on Computer Vision and Pattern Recognition (CVPR'06), Jun 17-22, 2006.*

(Continued)

Primary Examiner — Vu Le
Assistant Examiner — Xuemei Chen
(74) Attorney, Agent, or Firm — Wolfe-SBMC

(57) ABSTRACT

A computer-implemented method includes segmenting an input image into a plurality of image cues, each image cue representing a unique set of pixels of the input image. For each image cue, the method includes determining a set of image components, wherein each image component is associated with at least one adjustable factor to represent at least one characteristic of the image cue.

22 Claims, 9 Drawing Sheets

(56) References Cited

OTHER PUBLICATIONS

Levin, A., et al., "Spectral Matting," IEEE Conference on Computer Vision and Pattern Recognition (CVPR), Jun. 2007.*
Fang, H., et al., "Detail preserving shape deformation in image editing," ACM Transactions on Graphics (TOG), vol. 26, Jul. 2007.*
Cho, T.S., et al., "The patch transform and its applications to image editing," IEEE Conference on Computer Vision and Pattern Recognition, Jun. 2008.*

* cited by examiner

IMAGE DECOMPOSITION

CROSS REFERENCE TO RELATED APPLICATIONS

This U.S. patent application claims priority under 35 U.S.C. §119(e) to U.S. Provisional Application 61/096,631, filed on Sep. 12, 2008. The disclosures of this prior applications is considered part of the disclosure of this application and is incorporated herein by reference in its entirety.

BACKGROUND

The present disclosure relates to image decomposition.

Image segmentation refers to the decomposition of an image into different image components and is instrumental in various types of image analysis. For example, a document reader may first segment various characters included in a document prior to attempting to identify each segmented character.

SUMMARY

The specification describes technologies relating to segmenting images in a multi-level hierarchical manner resulting a set of image components with custom-adjustable parameters.

In general, one aspect of the subject matter described in this specification can be embodied in a computer-implemented method that includes segmenting an input image into a plurality of image cues, each image cue representing a unique set of pixels of the input image. The method also includes, for each image cue, determining a set of image components, wherein each image component is associated with at least one adjustable factor to represent at least one characteristic of the image cue. Other implementations of this aspect include corresponding systems and computer program products.

These and other implementations can optionally include one or more of the following features. The unique set of pixels may be represented by a collection of coherent pixel values. The set of image components may include an adjustable image matte component for controlling at least one contour representative of a shape of the at least one component. The adjustable image matte component may include a one-dimensional contour component sampled perpendicular to the at least one contour, and a set of image patches representing the contour and controlling a degree of fuzziness of the adjustable image matte component. The set of image components may also include an adjustable image shading component for filtering luminance of each image component. The set of image components may also include an adjustable image texture component for estimating a texture summary by using gray-level variations including a plurality of image patches, each of the plurality of image patches representing at least one gray-level variation. The method may also include extracting at least one foreground element of the input image and merging at least two edited image components to produce an output image.

In general, one aspect of the subject matter described in this specification can be embodied in a system that includes a memory for storing data and a display for presenting an image. The system also includes a computing device that includes an image multi-cue extractor configured to segment an input image into a plurality of image cues, each image cue representing a unique set of pixels of the input image; and an image adjuster, for each image cue, configured to determine a set of image components, wherein each image component is associated with at least one adjustable factor to represent at least one characteristic of the image cue.

These and other implementations can optionally include one or more of the following features. The unique set of pixels may be represented by a collection of coherent pixel values. The set of image components may include an adjustable image matte component for controlling at least one contour representative of a shape of the at least one component. The adjustable image matte component may include a one-dimensional contour component sampled perpendicular to the at least one contour, and a set of image patches representing the contour and controlling a degree of fuzziness of the adjustable image matte component. The set of image components may include an adjustable image shading component for filtering luminance of each image component. The set of image components may include an adjustable image texture component for estimating a texture summary by using gray-level variations including a plurality of image patches, each of the plurality of image patches representing at least one gray-level variation. The system may also include extracting at least one foreground element of the input image and merging at least two edited image components to produce an output image.

In general, one aspect of the subject matter described in this specification can be embodied in a computer program product, encoded on a computer-readable medium, operable to cause data processing apparatus to perform operations that include segmenting an input image into a plurality of image cues, each image cue representing a unique set of pixels of the input image. Operations also include, for each image cue, determining a set of image components, wherein each image component is associated with at least one adjustable factor to represent at least one characteristic of the image cue.

These and other implementations can optionally include one or more of the following features. The unique set of pixels may be represented by a collection of coherent pixel values. The set of image components may include an adjustable image matte component for controlling at least one contour representative of a shape of the at least one component. The adjustable image matte component may include a one-dimensional contour component sampled perpendicular to the at least one contour, and a set of image patches representing the contour and controlling a degree of fuzziness of the adjustable image matte component. The set of image components may include an adjustable image shading component for filtering luminance of each image component. The set of image components may include an adjustable image texture component for estimating a texture summary by using gray-level variations including a plurality of image patches, each of the plurality of image patches representing at least one gray-level variation. Operations may also include extracting at least one foreground element of the input image. Operations may also include merging at least two edited image components to produce an output image.

In general, one aspect of the subject matter described in this specification can be embodied in a computer-implemented method that includes executing instructions on a specific apparatus so that binary digital electronic signals representing an input image are segmented into binary digital electronic signals representing a plurality of image cues, each image cue representing a unique set of pixels of the input image. The method also includes for each image cue, executing instructions on the specific apparatus so that a set of image components are determined, wherein each image component is associated with at least one adjustable factor to represent at least one characteristic of the image cue. The method also includes storing the resulting binary digital electronic signals representing the plurality of image cues and the set of image components in a location in memory of said specific apparatus for later use.

Particular implementations of the subject matter described in this specification can be implemented to realize one or more of the following advantages. By decomposing a digital image into a set of coherent image cues, associated image characteristics of each image cue may be analyzed and manipulated separately to achieve desired visual properties that can be perceived in a composite output image.

The details of one or more implementations of the disclosure are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
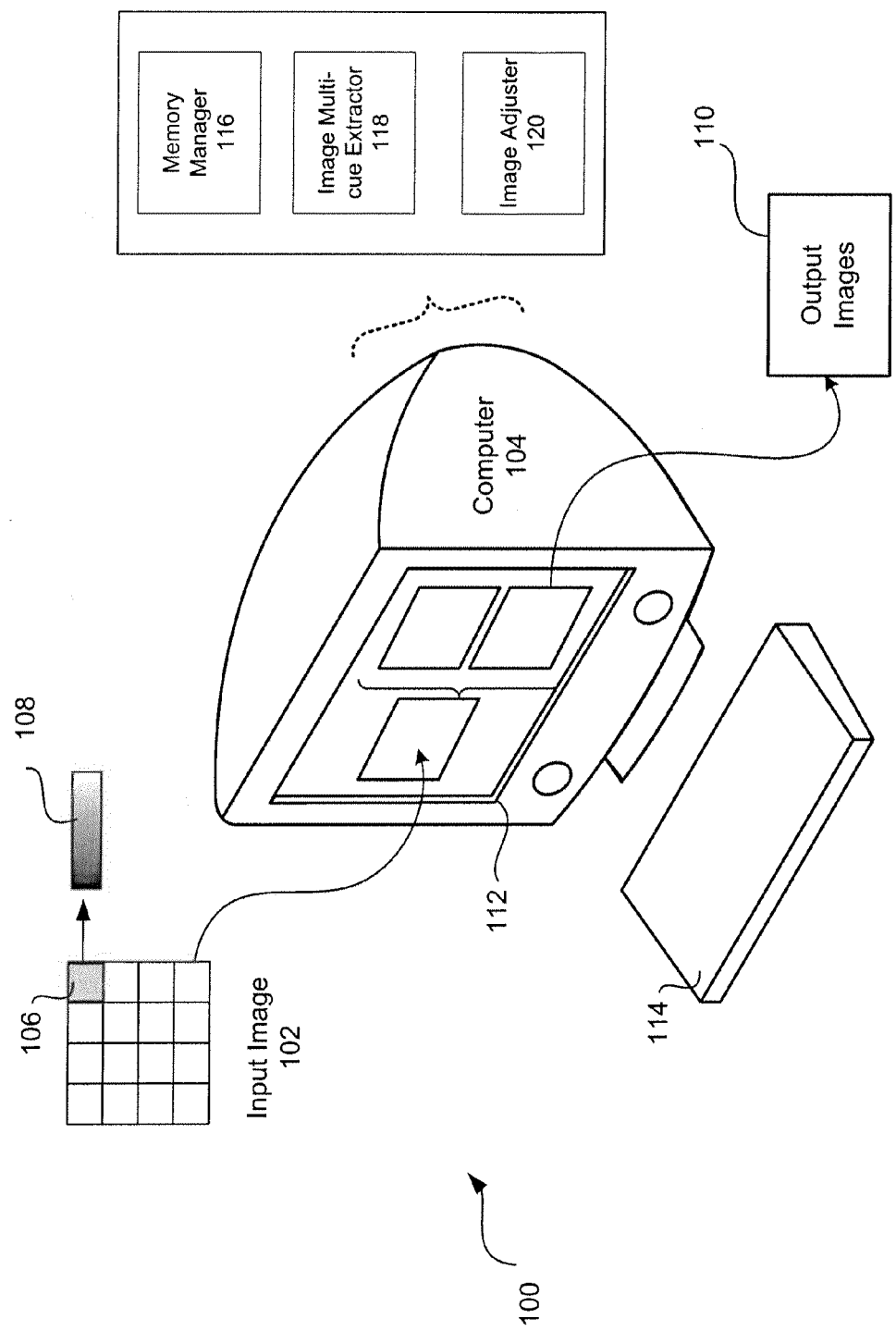
FIG. 1 is a schematic view of a computer executing image decomposition operations.

Referring to FIG. 1, an exemplary system 100 is illustrated for processing and presenting an input image 102 by a desktop computer system 104 or a laptop computer system (not shown) that typically has information storage, computing and displaying capabilities.

In digital imaging applications, an exemplary input image 102 may be composed of multiple picture elements, in which the smallest piece of information in the image is referred to as a pixel 106. Pixels are normally arranged in a regular two-dimensional grid, and are often represented using dots, squares, or rectangles. Each pixel can be considered a sample of the original image 102, where more samples typically provide better resolution and a more accurate representation of the image. Each pixel may correspond to an amount or quantity of light. In the realm of physics, terms such as intensity or luminance are used to describe the energy density of light. The term brightness is often used to describe perceived intensity in the psychological sense of visual perception. Pixel intensity may be variable. For example, in some color systems, each pixel may be defined by three or four color components such as red, green, and blue, or cyan, magenta, yellow, and black. In some implementations, each pixel on the image 102 can be associated with a gray level value, which represents brightness of that particular pixel. For example, grayscale levels (represented with a graphical slider 108 in FIG. 1) may range from the color black to an absence of color (represented by the color white).

To store and digitally process the input image 102, the computer system 104 executes operations to sample and quantize (digitize) the image. In this particular arrangement, the computer 104 includes a display 112, which can be touch sensitive. The computer 104 also includes a keypad 114, which may be used in conjunction with the display 112 to receive user input in processing the input image 102. For example, a number of available software programs may be presented and invoked on the display 112 upon making one or more selections with the keyboard 114, some operations can be issued and performed by the computer 104 (via a wire or wireless connection) on the input image 102. For example, In this particular arrangement, the computer 104 includes a memory manager 116 that allocates and stores data. In this illustration the memory manager 116 may be a random access memory (RAM) or other type of volatile memory (e.g., dynamic RAM (DRAM), static RAM (SRAM), etc.). Storage devices such as hard drives may be implemented, individually or in combination with the memory manager 116 for storing the content, however, volatile memory is typically used for its relatively fast accessibility. In segmenting and processing the input image 102, the computer 104 may use an image multi-cue extractor 118 to partition an input image into a plurality of image cues, each image cue representing a unique set of pixels of the input image. Subsequently, the computer 104 may use an image adjuster 120, for each image cue, to determine a set of image components. In particular, each image component is associated with at least one adjustable factor to represent at least one characteristic of the image cue.

Generally speaking, sampling an image is performed on a finite number of points (e.g., pixels). Once sampled, each individual point may be assigned a value (e.g., represented with a finite number of bits), referred to as quantization, which represents a particular shade with the gray scale. For one image processing scheme, the image 102 is sampled on a regular grid of squares as shown in FIG. 1. The sampling process may be visualized as overlaying an uniform grid on the image 102 and sampling an image function that is used to represent the image mathematically at the center of each grid square. Increasing grid points correspondingly increase image resolution. In some implementations, the gray scale values of each pixel (or at each grid square) may be represented with integer values ranging from 0 for the color black to 255 for the color white.

In computer vision, image segmentation refers to the process of partitioning a digital image into multiple regions (sets of pixels). Segmentation may simplify and change the representation of an image into a format that is meaningful and convenient for image manipulation and analysis. Image segmentation may be used for such operations as locating objects and boundaries (lines, curves, etc.) in images. In FIG. 1, an output image 104 may represent image segmentation with a set of regions that collectively cover the entire image, or a set of contours extracted from the input image 102 (i.e., edge detection).

In digital image processing domain, despite the fact that the space of all images is fairly large, we may sufficiently focus on images that resemble scenes in the natural environment. Such images are usually called natural images. This is because our perceptual systems have evolved to adapt and operate in the natural environment, human vision is most sensitive to natural images which lie in a much lower dimensional subspace. Natural images are not random collections of pixel values, rather they tend to be coherent, in some instance highly coherent. Such coherency may be attributed, for example, to lighting. For example, most images tend to captured under a small set of lights and exhibit smooth consistent shading throughout. Also attributable, many images have the same textures repeated across the image. Boundaries between segments of an image tend to be coherent and can attribute.

Figure 2:
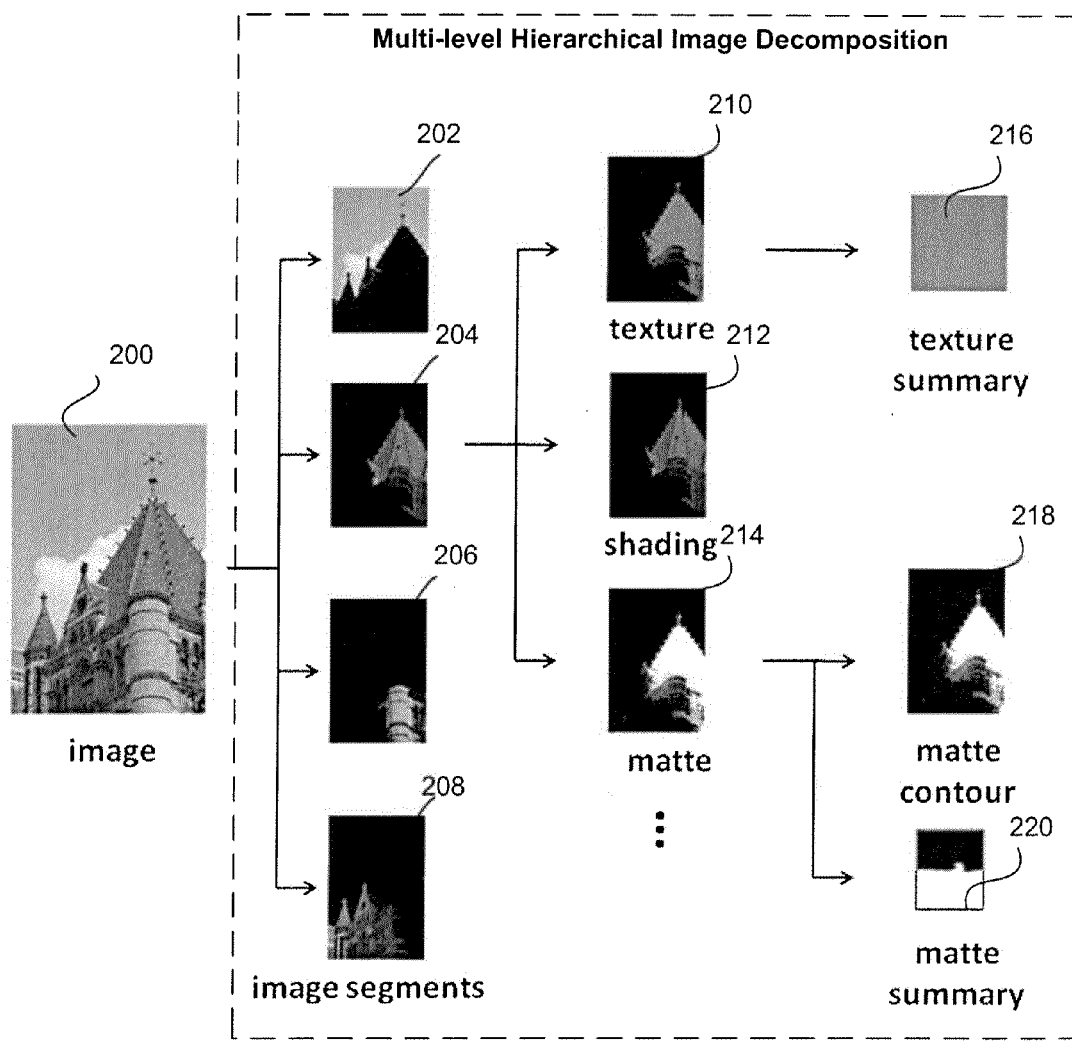
FIGS. 2 and 3 illustrate a multi-level hierarchical representations of decomposed images.
Figure 3:
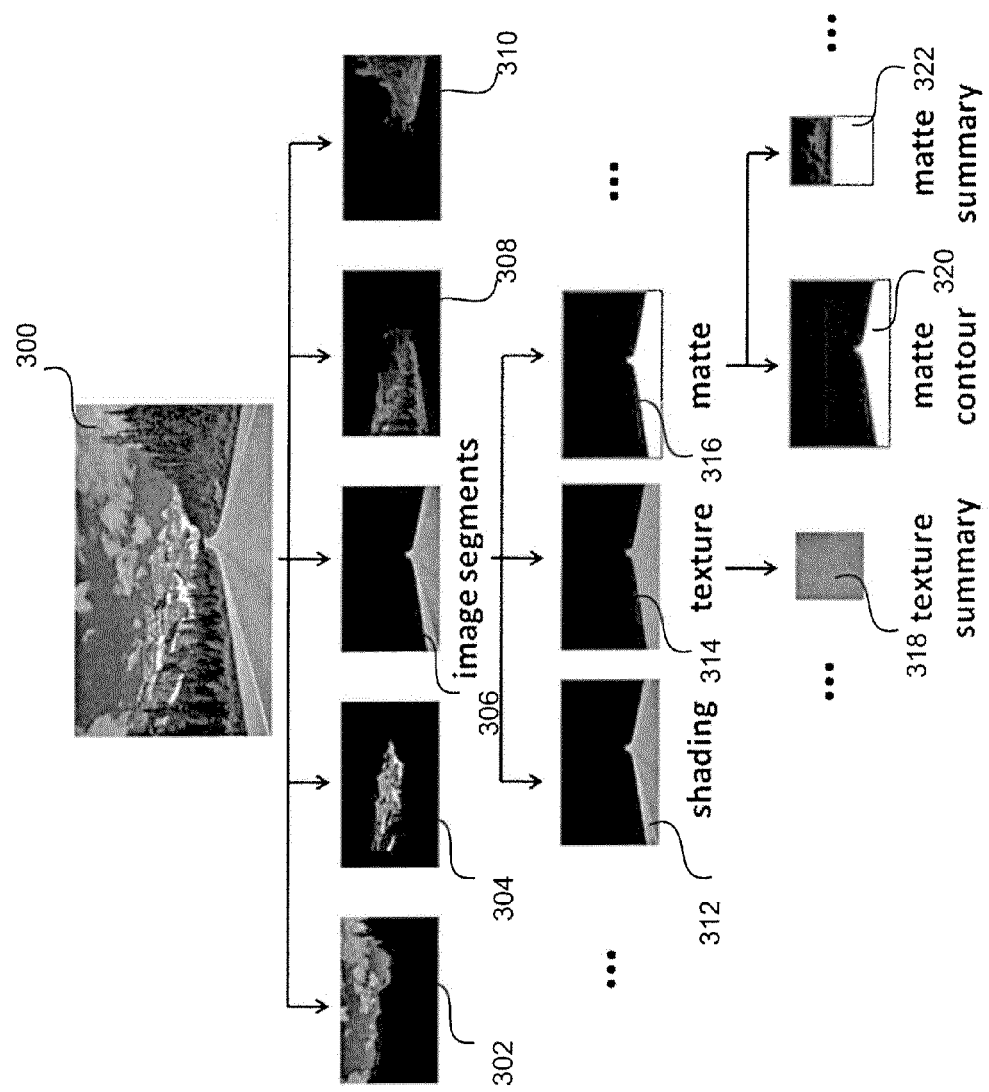
Figure 5:
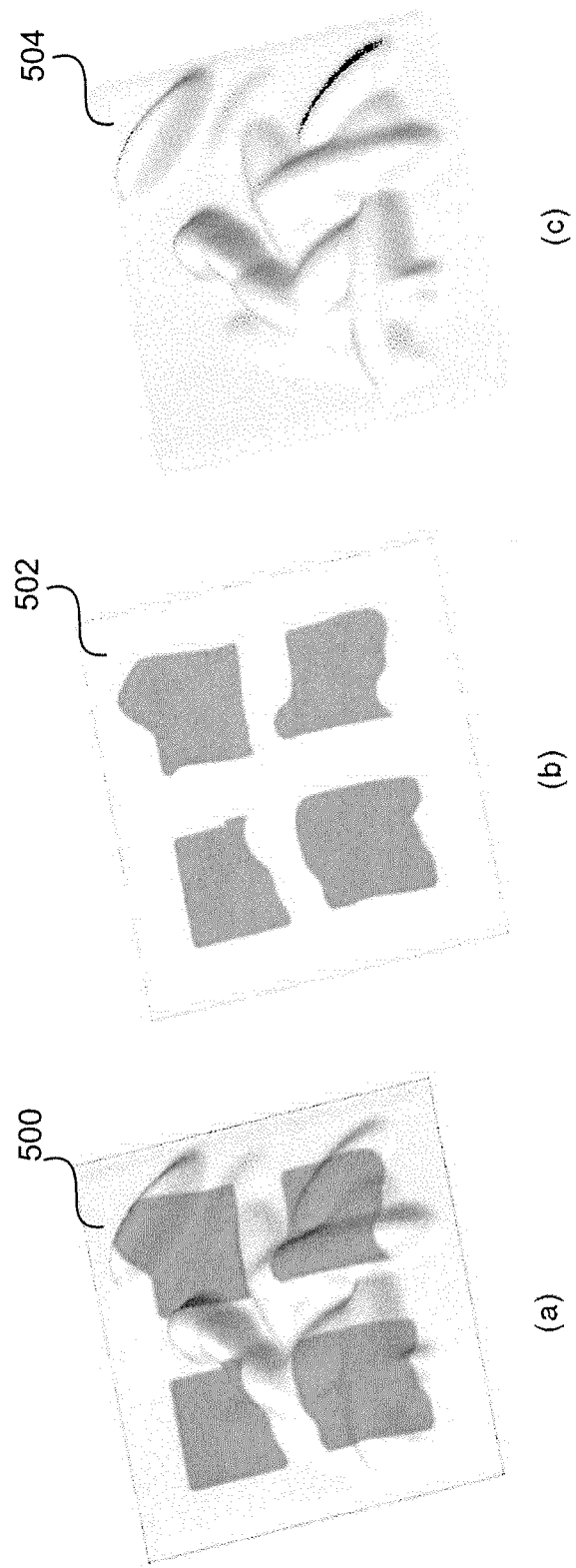
FIG. 5 illustrates exemplary intrinsic images.

FIGS. 2 and 3 illustrate a novel multi-level tree-like hierarchical image decomposition technique. Separating an image in terms of multi-cues offers an advantage because each cue comprises a small set of factors that can be manipulated easily by a user. Propagating changes to each cue up the tree allows the user to change the boundaries, shading and texture of the original image separately, and ultimately to reconstruct an output image with desired appearance. By combining methods that deal with image segmentation, intrinsic image decompositions and image summarization into a single system, an image representation is provided and allows a user to edit one or more aspects of an image separately using a relatively small set of intuitive controls. Separating an image into texture and shading components. i.e., intrinsic images, is a classic computer vision problem that is in general, under constrained and thereby complex. In some implementations, appearance of an image is determined by a number of characteristics, such as the illumination of the image, the shape of the surfaces displayed in the image, and the reflectance of each surface. "Intrinsic images" are used to represent these characteristics. Referring to FIG. 5, for example, an image 500 may be decomposed into two intrinsic images: an illumination image 502 (which is also referred to as a shading image) and a reflectance image 504. Intrinsic images can be considered as a mid-level image decomposition due to a lack of a full, three-dimensional description of the image.

In some implementations, referring back to FIG. 2, an input image 200 may undergo a first level decomposition using a spectral segmentation method. As a result, the image 200 is segmented into multiple image components 202, 204, 206, 208 which display regions of the image that correspond roughly to a same object (e.g., a church roof). This type of segmentation may not merely produce binary images (i.e., pictures having only two gray levels).

In some examples, rather than dividing the image 200 into disjoint image components, the user may desire to manipulate boundaries when merging different image regions. Techniques for estimating such segmentations in computer vision is known as matting and the resulting segmentations are known as alpha mattes. In performing digital matting, a foreground element of the image 200 may be extracted from a background image by estimating a color and opacity for the foreground element at each pixel. The opacity value at each pixel is typically called its alpha, and the opacity image, taken as a whole, is referred to as the alpha matte or key. Fractional opacities (between 0 and 1) are important for transparency and motion blurring of the foreground element, as well as for partial coverage of a background pixel around the foreground object's boundary. Matting may be used to composite the foreground element into a new scene. In some examples, extracting a matte of a particular image may become quite challenging in some difficult cases such as thin fibers of fur or hair. The difficulty of the problem is inherently under constrained in the sense that for a foreground element over a single background image, there are in general an infinite number of interpretations for the foreground's color versus opacity. Some matting algorithms have been explored to attempt to separate the image into a foreground and a background and thus compute a single matte. Specifically, matting algorithms may assume that each pixel $I_i$ in an input image is a linear combination of a foreground color $F_i$ and a background color $B_i$:

$$I_i = \alpha_i F_i + (1-\alpha_i) B_i \qquad \text{Equ. (1)}$$

This is known as the compositing equation. Here, the compositing equation is generalized by assuming that each pixel is a convex combination of K image layers $F^1, \ldots, F^K$:

$$I_i = \sum_{K=1}^{K} \alpha_i^K F_i^K \qquad \text{Equ. (2)}$$

Figure 4:
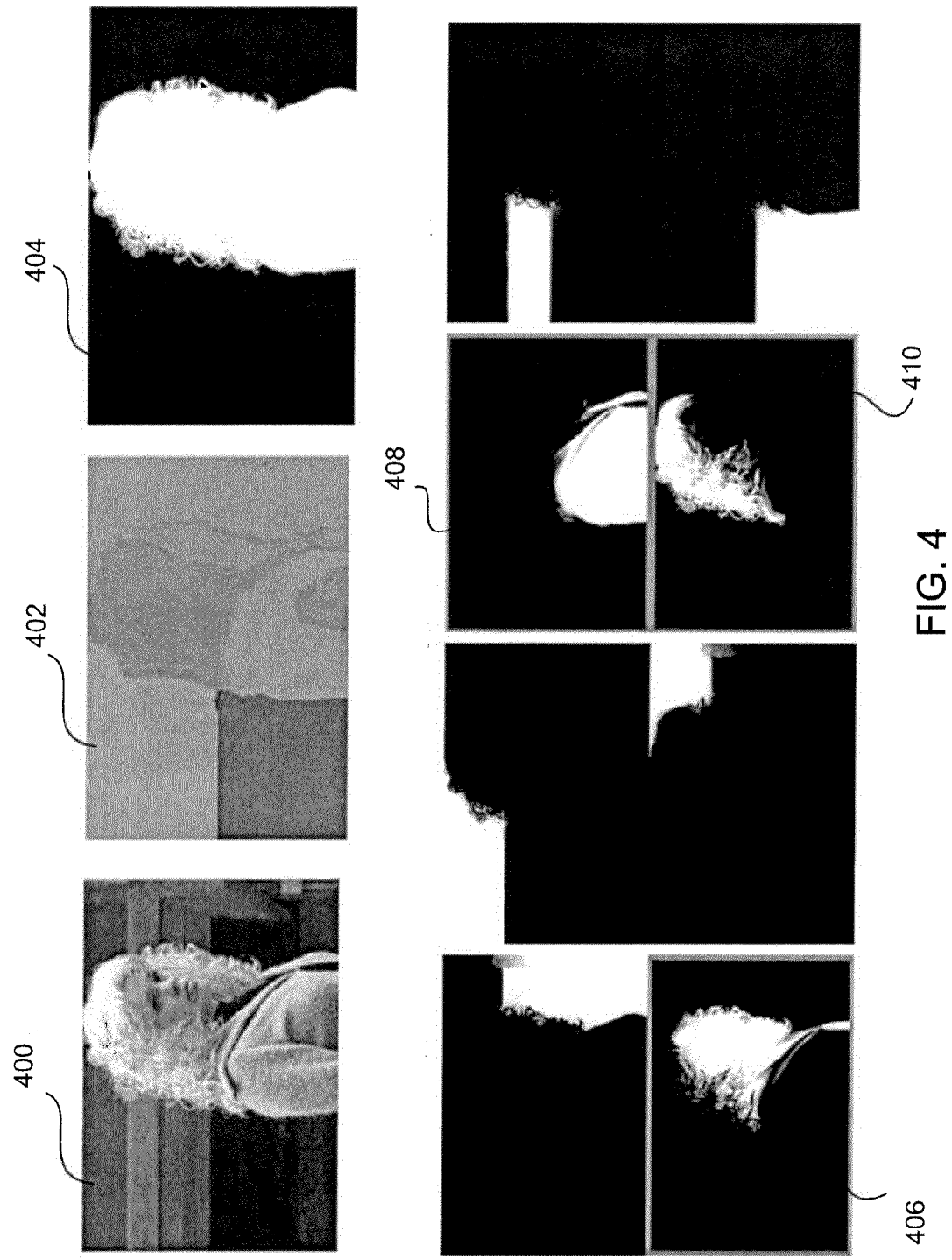
FIG. 4 illustrates spectral segmentation and spectral matting.

The K vectors $\alpha^K$ are the matting components of the image, which specify the fractional contribution of each layer to the final color observed at each pixel. The matting components are nonnegative and sum to one at every pixel. By having these low-level fragments in a sometimes over-segmented image, one can construct higher level, semantically meaningful foreground mattes. Therefore, rather than seeking disjoint image partitioning, we, in this disclosure, recover the fractional foreground coverage at each pixel. In particular, we obtain real-valued matting components via a linear transformation of the smallest eigenvectors for eh matting Laplacian matrix and these matting components are implemented as building blocks for construction of complete foreground mattes. For example, referring to FIG. 4, given the input image 400, one can produce an unsupervised disjoint hard partitioning shown in 402. In contrast, we can compute a set of overlapping, fractional, matting components and combine selected components (e.g., image components 406, 408 and 410) to yield the foreground matte of the girl. The result is illustrated in 404.

Subsequently, a second level decomposition in FIG. 2 may be performed on each of the multiple image components 202, 204, 206, 208 providing a texture component 210, a shading component 212 and a matte component 214. In general, these methods typically work on entire images. A technique may be used for each individual image component as the textures and shading within an image component are more likely to be coherent and specify stronger points on the intrinsic images. In some examples, the luminance of the image components is filtered using the edge-preserving bilateral filter to yield a shading term. Dividing the original image by the shading term generates the texture term. While this may be incorrect across a whole image, it is more likely to be accurate within a segment. Details of combining the shading estimation with the texture summarization will be described below.

As shown in FIG. 2, the separate matte component 214 may be determined for each image component in connection with spectral matting technique in which a set of matting components are estimated and combined to produce a single matte. However, as for the technique shown in FIG. 2, each matting component corresponds approximately to it respective fuzzy segment.

At a third level image decomposition, each matte is further decomposed into a contour component 218 and a set of exemplar matte patches 220. In addition, a texture summary component 216 is estimated for each texture component 210, which will be described in detail below. Generally speaking, the matte components by themselves are difficult to use. Additionally, the boundaries of the matte component 214 in general contain a lot of redundancy. Such redundancy may be leveraged in a user intuitive manner, for the matte components. For each matte component, an isocontour is calculated that represents the shape of the component. Sampling the matte perpendicular to this contour yields a one-dimensional matte strip. The contour and the matte strip together describe the matte component 214 completely.

Because of the redundancy in the image boundaries, the matte strips can be decomposed further. In some implementations, an image can be represented by small image patches. More recently, patches have been used successfully for synthesizing images and videos, in which patches from one part of an image have been stitched together to synthesize new images with similar texture. To jointly analyze and synthesize data, patch-based probability models introduce a term referred to as "epitomes." Epitome refers to compiling patches drawn from input images into a condensed image model that represents many of the high order statistics in the input image. An advantage of learning a patch-based model from the input data is that the model can be used for a variety of inference tasks, such as image or texture classification, in-painting, super-resolution, texture transfer, and image segmentation.

Further, the matte component 214 is summarized using a small set of exemplar matte patches 220. However, none represent an alpha matte in terms of the contours and exemplar matte patches. This representation also allows a user to intuitively edit the boundaries in the image. By editing the contour the user can change the shape of each individual image component and by editing the matte patches the "fuzziness" of the matte can be controlled, thereby effecting the appearance of the component. The texture can be further represented in terms of exemplar texture patches.

In some examples, most textures tend to have repetitive patterns and in our third level decomposition, we seek to discover these patterns. This enables us to represent a larger texture in terms of a smaller patch that captures all the variation in the original. We use a method to estimate a texture summary component 216 that captures all the detail in the larger texture image 214. We divide both the texture image 214 and the summary 216 into overlapping patches and compute the closest corresponding patch in the texture image for every patch in the summary and vice versa. The summary patches may be updated to be as close as possible to the corresponding image patches. Linear least squares systems may also be constructed to update the summary by using the correspondences computed. Following this we re-compute the correspondences and repeat the process till the correlation value between the texture image reconstructed from the summary and the original texture image falls below a certain threshold.

In some examples, in order to achieve desirable results for a specific image decomposition, a user is allowed to guide the decomposition towards more relevant solutions. This may include letting the user to specify the number of image components in the original image, correct mattes by combining, splitting or modifying the estimated matte components, initializing the texture summarization, etc.

Figure 6:
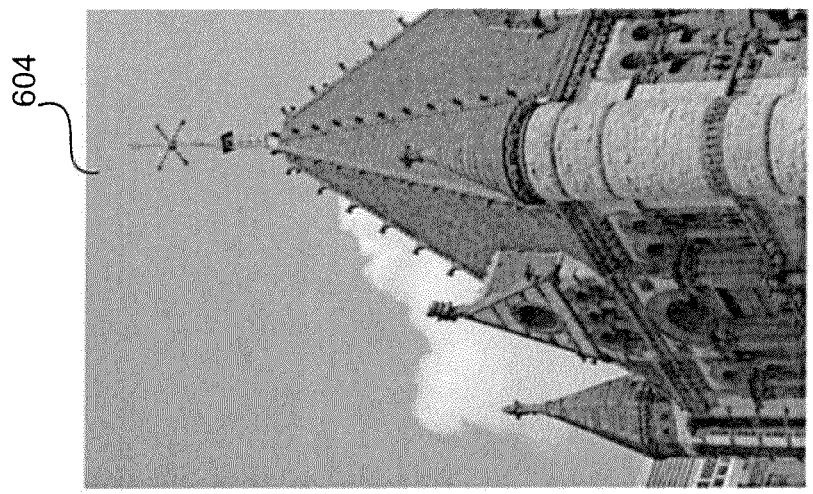
FIGS. 6-7 illustrate exemplary images that utilize a multi-level hierarchical image decomposition process.
Figure 6:
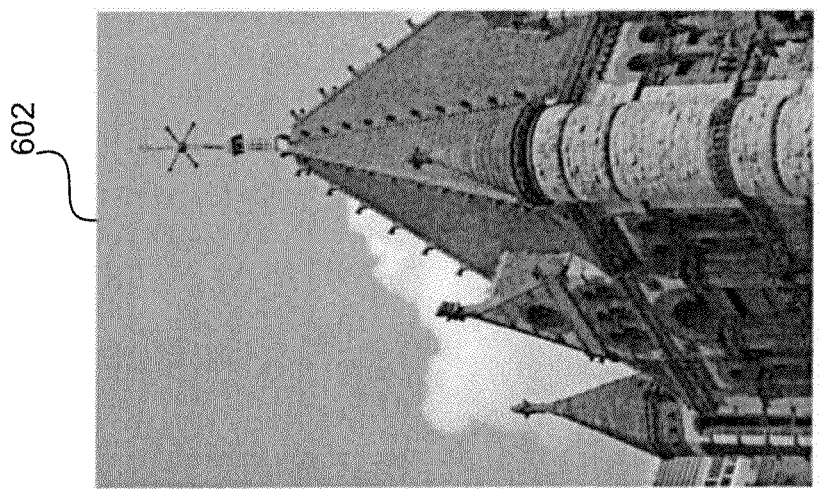
Figure 6:
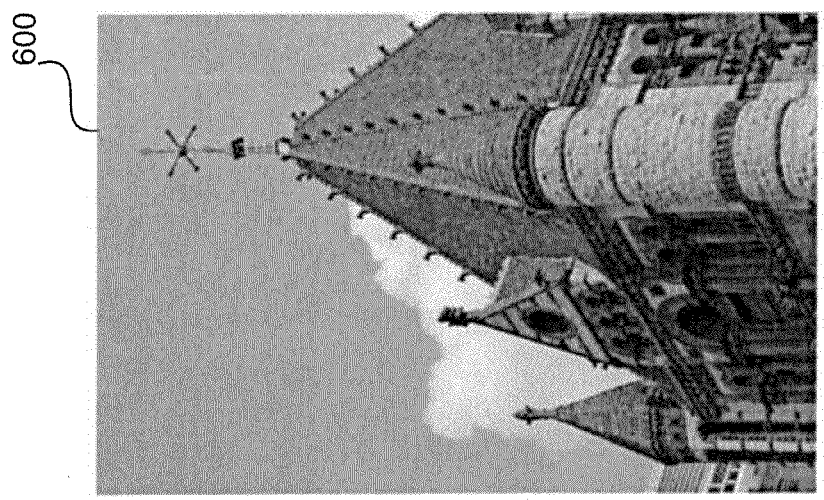

FIG. 6 shows by reconstructing the decomposition presented above for an input image 600, we can produce a reconstruction image 602 that preserves all the details in the original image 600. Moreover, image 604 shows that a simple edit on the texture patch for the image component corresponding to the roof of the building allows us to manipulate the image component while preserving the shading and boundaries.

Figure 7:
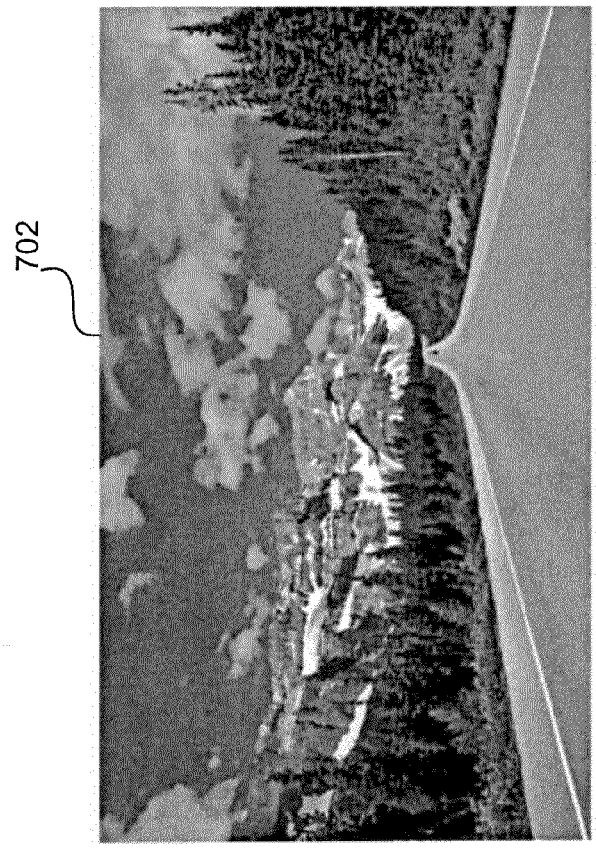
Figure 7:
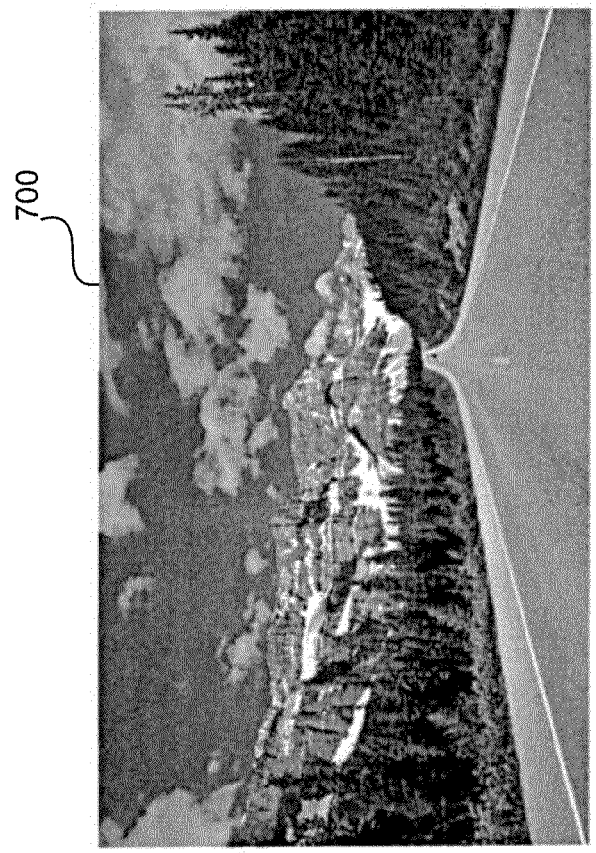

FIG. 7 is another example of performing the multi-level hierarchical image decomposition technique on a highway scene. The original image 700 can be reconstructed in image 702.

Figure 8:
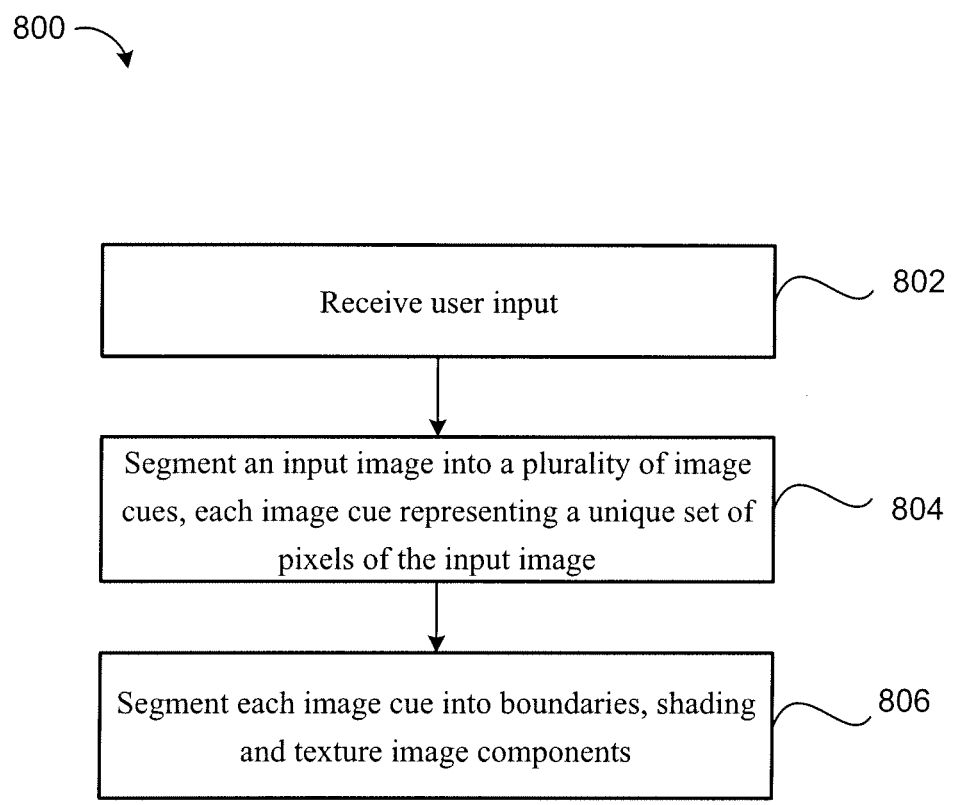
FIG. 8 is a flow chart that represents exemplary operations of an image multi-cue extractor.

Referring to FIG. 8, a flowchart 800 represents some exemplary operations of the image multi-cue extractor 118. Typically the operations are executed by a processor present in the computer 104 upon which the image multi-cue extractor 118 resides. However, the operations may also be executed by multiple processors present in multiple computers within a distributed computing system.

Operations include receiving 802 user input. For example, upon receiving an input image, the user may be allowed to specify the number of image cues he intends to deal with. Intuitively, because each image represents a collection of highly coherent pixels, more image cues may result in segmenting the original image into more subtler layers. Accordingly, the input image can be segmented 804 into a plurality of image cues based on fuzzy segmentation algorithms, each image cue representing a unique set of pixels of the input image. Such a first level decomposition of a particular image may allow the user to focus on a specific aspect or region of the original image. For each image cue, operations also include determining 806 a set of image components. Each image component is associated with at least one adjustable factor to represent at least one characteristic of the image cue. In this particular implementation, each image cue is segmented into boundaries, shading and texture image components.

Figure 9:
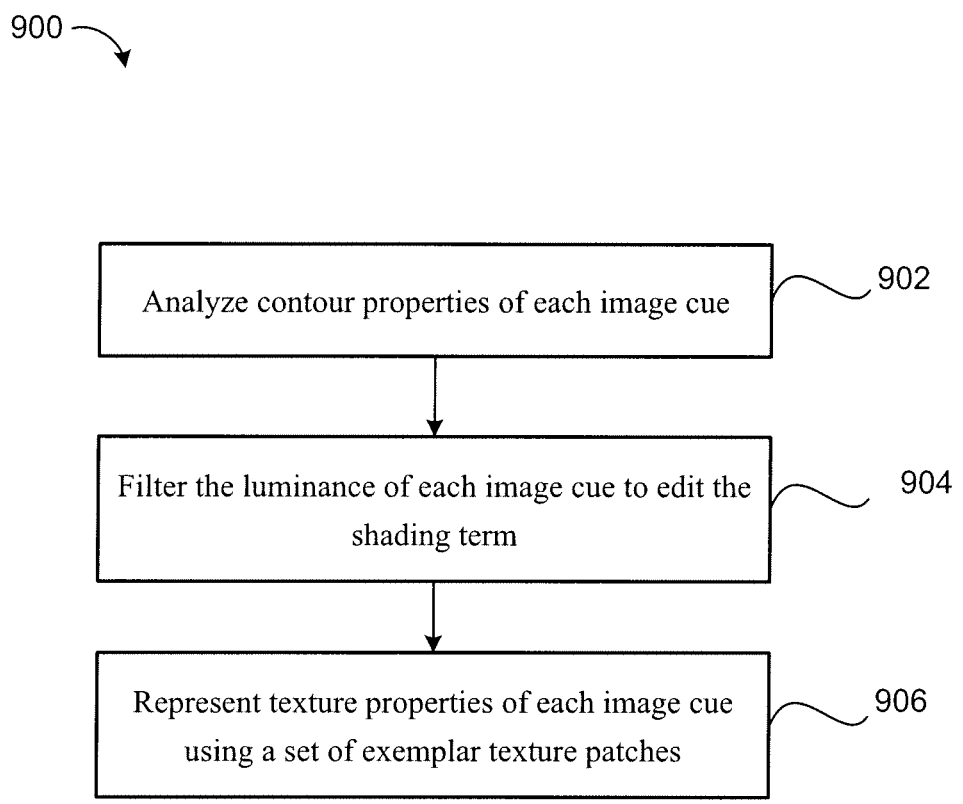
FIG. 9 is a flow chart that represents exemplary operations of an image adjuster.

Referring to FIG. 9, a flowchart 900 represents some exemplary operations of the image adjuster 120. Typically the operations are executed by a processor present in the computer 104 upon which the image adjuster 120 resides. However, the operations may also be executed by multiple processors present in multiple computers within a distributed computing system.

Operations include analyzing 902 contour properties of each image cue. As such, by computing and editing the contour, the user can intuitively change the shape of each individual image cue. In the meantime, the fuzziness of each cue is also controlled by editing each matte patches (e.g., matte summary 220 in FIG. 2), thereby affecting the appearance of the image cue. Subsequently, operations also include filtering 904 the luminance of each image cue to edit the shading term. In one particular arrangement, this is implemented by using an edge-preserving bilateral filter. Operations also include representing 906 texture properties of each image cue using a set of exemplar texture patches.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output.

The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method comprising:
    segmenting an input image into a plurality of image cues based on spectral content of the input image, each image cue representing a unique set of pixels of the input image;
    determining, for each image cue, a set of image components, each image component of the set associated with at least one adjustable factor representing at least one characteristic of the image cue, the set of image components comprising an adjustable image matte component for controlling at least one contour representative of a shape of the adjustable image matte component, the adjustable image matte component including:
        a one-dimensional contour component sampled perpendicular to the at least one contour;
        a set of image patches representing the at least one contour and controlling a degree of fuzziness of the adjustable image matte component; and
    determining at least one summary for at least one adjustable factor of one image component in the set of image components.

2. The computer-implemented method of claim 1, wherein the unique set of pixels is represented by a collection of coherent pixel values.

3. The computer-implemented method of claim 1, wherein the at least one contour in an iso-contour and the one-dimensional contour component is one-dimensional matte strip sampled perpendicular to the iso-contour.

4. The computer-implemented method of claim 1, wherein the set of image components further comprises an adjustable image shading component for filtering luminance of each image cue.

5. The computer-implemented method of claim 1, wherein the set of image components further comprises an adjustable image texture component for estimating a texture summary by using gray-level variations of a plurality of image patches, each of the plurality of image patches representing at least one gray-level variation.

6. The computer-implemented method of claim 1, further comprising extracting at least one foreground element of the input image.

7. The computer-implemented method of claim 1, further comprising merging at least two edited image components to produce an output image.

8. A system comprising:
    one or more processors; and
    a memory coupled to the one or more processors and including instructions that are executable by the one or more processors to perform operations comprising:
    segmenting an input image based on spectral content of the input image into a plurality of image cues, each image cue representing a unique set of pixels of the input image;
    determining, for each image cue, a set of image components, each image component of the set associated with at least one adjustable factor representing at least one characteristic of the image cue, the set of image components comprising an adjustable image matte component for controlling at least one contour representative of a shape of the adjustable image matte component, the adjustable image matte component including:
  a one-dimensional contour component sampled perpendicular to the at least one contour;
  a set of image patches representing the at least one contour and controlling a degree of fuzziness of the adjustable image matte component; and
determining at least one summary for at least one adjustable factor of one image component in the set of image components.

9. The system of claim 8, wherein the unique set of pixels is represented by a collection of coherent pixel values.

10. The system of claim 8, wherein the at least one contour in an iso-contour and the one-dimensional contour component is one-dimensional matte strip sampled perpendicular to the iso-contour.

11. The system of claim 8, wherein the set of image components further comprises an adjustable image shading component for filtering luminance of each image cue.

12. The system of claim 8, wherein the set of image components further comprises an adjustable image texture component for estimating a texture summary by using gray-level variations of a plurality of image patches, each of the plurality of image patches representing at least one gray-level variation.

13. The system of claim 8, wherein the instructions are further executable by the one or more processors to perform operations comprising extracting at least one foreground element of the input image.

14. The system of claim 8, wherein the instructions are further executable by the one or more processors to perform operations comprising merging at least two edited image components to produce an output image.

15. One or more computer-readable storage devices comprising processor-executable instructions that, responsive to execution by a processor, implement an image decomposition module to:
  segment an input image into a plurality of image cues based on spectral content of the input image, each image cue representing a unique set of pixels of the input image;
  determine, for each image cue, a set of image components, each image component of the set associated with at least one adjustable factor representing at least one characteristic of the image cue, the set of image components comprising an adjustable image matte component for controlling at least one contour representative of a shape of the adjustable image matte component, the adjustable image matte component including:
    a one-dimensional contour component sampled perpendicular to the at least one contour;
    a set of image patches representing the at least one contour and controlling a degree of fuzziness of the adjustable image matte component; and
  determine at least one summary for at least one adjustable factor of one image component in the set of image components.

16. The one or more computer-readable storage devices of claim 15, wherein the unique set of pixels is represented by a collection of coherent pixel values.

17. The one or more computer-readable storage devices of claim 15, wherein the at least one contour is an iso-contour and the one-dimensional contour component is one-dimensional matte strip sampled perpendicular to the iso-contour.

18. The one or more computer-readable storage devices of claim 15, wherein the set of image components further comprising an adjustable image shading component for filtering luminance of each image cue.

19. The one or more computer-readable storage devices of claim 15, wherein the set of image components further comprising an adjustable image texture component for estimating a texture summary by using gray-level variations of a plurality of image patches, each of the plurality of image patches representing at least one gray-level variation.

20. The one or more computer-readable storage devices of claim 15, further comprising additional processor-executable instructions that, responsive to execution by the processor, implement the image decomposition module to extract at least one foreground element of the input image.

21. The one or more computer-readable storage devices of claim 15, further comprising additional processor-executable instructions that, responsive to execution by the processor, implement the image decomposition module to merge at least two edited image components to produce an output image.

22. A computer-implemented method comprising:
  segmenting an input image into a plurality of image cues based on spectral content of the input image, each image cue representing a unique set of pixels of the input image;
  determining, for each image cue, a set of image components, each image component of the set associated with at least one adjustable factor representing at least one characteristic of the image cue, the set of image components comprising an adjustable image matte component for controlling at least one contour representative of a shape of the adjustable image matte component, the adjustable image matte component including:
    a one-dimensional contour component sampled perpendicular to the at least one contour;
    a set of image patches representing the at least one contour and controlling a degree of fuzziness of the adjustable image matte component; and
  altering a characteristic of one of the image cues responsive to user input specifying a change to one of the respective image components.

* * * * *